United States Patent [19]
Gammon et al.

[11] Patent Number: 5,928,477
[45] Date of Patent: Jul. 27, 1999

[54] METHOD AND APPARATUS FOR REMOVING WATER FROM AN AQUEOUS FLUID MIXTURE

[75] Inventors: Peter Henry Firth Gammon, St. John's; Gary James Dinn, Paradise; John Joseph Whitten, Portugal Cove, all of Canada

[73] Assignee: Inland Technologies Inc., Canada

[21] Appl. No.: 09/004,114

[22] Filed: Jan. 7, 1998

[51] Int. Cl.$^6$ .............................. B01D 3/38; B01D 3/42; C07C 27/28

[52] U.S. Cl. ........................... 203/18; 202/160; 202/176; 203/2; 203/3; 203/22; 203/24; 203/49; 203/93; 203/94; 203/97; 203/98; 568/916

[58] Field of Search .................................. 203/3, 18, 24, 203/22, 49, 2, 97, 98, 93, 94, 20, 40; 159/24.1, 28.6, DIG. 4, 16.3, 6.1, 27.2; 202/176, 160, 197, 264, 200; 210/512.1, 512.2; 55/337, 345; 406/173; 568/916

[56] References Cited

U.S. PATENT DOCUMENTS

| | | |
|---|---|---|
| 2,589,406 | 3/1952 | Latham, Jr. . |
| 3,589,984 | 6/1971 | Reid ......................................... 203/18 |
| 4,168,211 | 9/1979 | Pottharst, Jr. ............................. 203/26 |
| 4,182,659 | 1/1980 | Anwer et al. . |
| 4,743,343 | 5/1988 | Sakai ........................................ 203/22 |
| 5,552,023 | 9/1996 | Zhou . |
| 5,587,054 | 12/1996 | Keith . |
| 5,788,745 | 8/1998 | Hahn ........................................ 203/18 |

FOREIGN PATENT DOCUMENTS

| | | |
|---|---|---|
| 2074031 | 1/1994 | Canada . |
| 2106358 | 3/1995 | Canada . |
| 2116827 | 5/1995 | Canada . |
| 8102088 | 8/1981 | WIPO ..................................... 203/19 |

Primary Examiner—Virginia Manoharan
Attorney, Agent, or Firm—Bachman & LaPointe, P.C.

[57] ABSTRACT

A method and apparatus permits concentration of a water-miscible organic liquid in a mixture of such liquid and water, with recovery of a desired concentrate of the water-miscible organic liquid and water, and a relatively clean water containing only a very low content of the water-miscible organic liquid which enables disposal of the water in sewage systems, the method and apparatus thus enhancing the ability to satisfy environmental concerns; the method has particular application to the recovery of a reusable glycol/water mixture from diluted spent aircraft deicer fluid (ADF). The diluted spent ADF is heated in a plate heat exchanger with steam to form a hot frothing mass of liquid and steam which is delivered to a cyclone concentrator, the hot frothing mass in the plate heat exchanger and the cyclone concentrator are maintained at a first pressure and a steam phase including steam bubbles in the hot frothing mass is efficiently separated from and withdrawn from a hot liquid phase which represents a more concentrated glycol/water mixture. The steam withdrawn from the hot frothing mass is compressed to a second pressure higher than the first pressure and cycled back to provide the steam input of the plate heat exchanger. After start-up the operation proceeds, with maintenance of the pressure differential, exploiting the heat of the compressed steam with no requirement for external heating. The method and apparatus may be applied to other aqueous fluid mixtures.

20 Claims, 1 Drawing Sheet

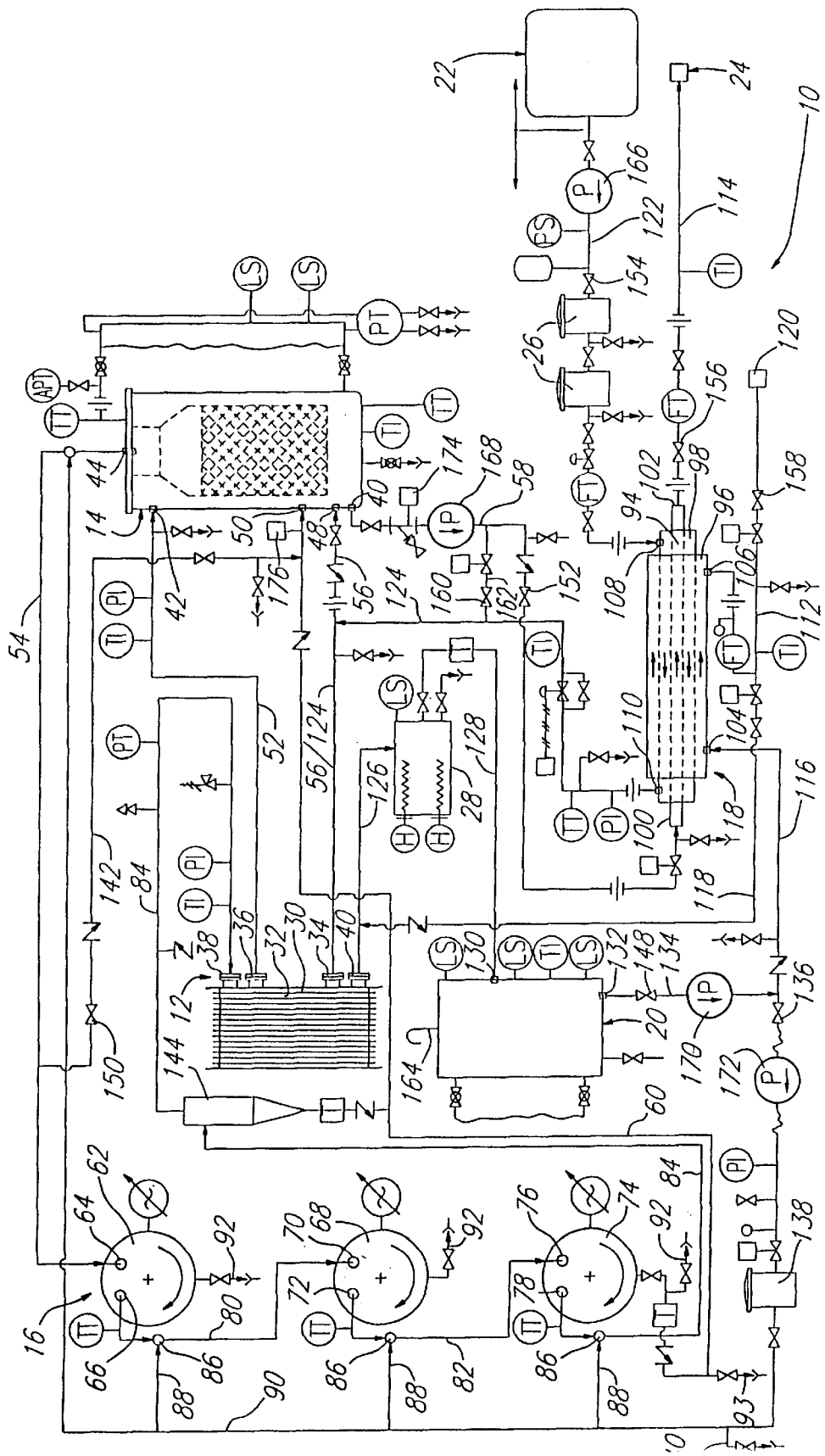

METHOD AND APPARATUS FOR REMOVING WATER FROM AN AQUEOUS FLUID MIXTURE

BACKGROUND OF THE INVENTION i) Field of the Invention

This invention relates to a method and apparatus for removal of diluent water from an aqueous fluid mixture, especially an aqueous organic liquid to increase the concentration of the organic liquid in water.

The invention has particular application in the treatment of diluted spent aircraft deicing fluid to recover the deicing fluid at an acceptable concentration in water.

ii) Description of Prior Art

Ice is removed from the wings of aircraft prior to flight, by spraying the wings with a deicing fluid. Typically this deicing fluid is an aqueous solution of ethylene glycol or propylene glycol or a mixture thereof. This solution typically contains about 55%, by weight, of the glycol and 45%, by weight, of water together with minor amounts of additives such as surfactants and inhibitors.

The deicing fluid, also referred to as aircraft deicing fluid (ADF) is recovered from the tarmac where the aircraft deicing is carried out, and typically is scavenged through gravity drains or by vacuum trucks. The recovered ADF is diluted by aqueous precipitation, for example, snow and ice, which it contacts on the surface of the aircraft or on the tarmac, and is also contaminated with various contaminants including dissolved runway deicing salts, grit, traces of fuel and lubricating oils and other debris.

Traditionally the collected material is sorted according to its approximate concentration of glycol and stored in tanks for subsequent processing.

Different commercial procedures for recovery of the glycol involve filtration, deionization or distillation. Canadian Patent Specification 2,116,827 of A. Viszolay et al describes stripping water away using a packed heated tower and distilling the glycol under vacuum.

Canadian Patent Specification 2,106,358 P. Eastcott et al employs a concentrator having a packing medium of glass shards providing a labyrinth for flow of air in one direction and thin streams of glycol in a generally opposite direction.

Canadian Patent Specification 2,074,031 B. Dobrofsky employs reaction of the water component of diluted spent deicing fluid with an agent such as calcium oxide to form a system in which the glycol is insoluble. U.S. Pat. No. 5,552,023 S. J. Zhou employs a reverse osmosis membrane to achieve a first level of water removal followed by membrane evaporation employing a porous hydrophobic membrane.

Nevertheless, there remains a need for a heat efficient system for recovering the glycol of spent aircraft deicing fluid at a concentration acceptable for re-use of the glycol in an aircraft deicing fluid.

SUMMARY OF THE INVENTION

It is an object of this invention to provide a method and apparatus for removing diluent water from an aqueous fluid mixture, especially an aqueous organic liquid.

In particular this invention seeks to provide such a method and apparatus for concentrating spent aircraft deicing fluid based on a glycol and water which fluid has become diluted with water.

In accordance with one aspect of the invention there is provided a method of removing diluent water from spent deicing fluid to provide a re-usable fluid comprising: a) heating, with hot steam, a spent deicing fluid containing diluent water to provide a hot frothing mass of liquid deicing fluid containing bubbles of steam vapor, at a first pressure, b) feeding said hot frothing mass into a separating chamber of a cyclone, c) separating the hot frothing mass cyclonically in said separating chamber at said first pressure, with formation of a discrete hot liquid deicing fluid phase and a discrete steam vapor phase, in said separating chamber, d) recovering said hot liquid deicing fluid phase from said separating chamber, e) recovering said steam vapor phase from said separating chamber, f) compressing said steam vapor phase in at least one compression stage to develop a hot compressed steam at a second pressure, and g) recycling said hot compressed steam at said second pressure from step f) to step a) for said heating of the spent deicing fluid in step a), said first pressure being below said second pressure.

In accordance with another aspect of the invention there is provided an apparatus for removing diluent water from an aqueous fluid mixture comprising: A) a heat exchanger having a first flow passage therethrough for an aqueous fluid mixture containing diluent water, said first passage being in heat exchange relationship with a second flow passage for steam, said first passage having an inlet port and an outlet port, and said second flow passage having an inlet port and an outlet port; B) a cyclone having a separating chamber with liquid inlet port and a first conduit for liquid flow communication of said outlet port of said first passage with said inlet port of said cyclone; a steam outlet port in said cyclone and a liquid outlet port communicating with said separating chamber in said cyclone; C) at least one compressor for compressing steam having a steam inlet port and a second conduit for steam flow communication of said steam outlet port of said cyclone with said steam inlet port of said at least one compressor; a compressed steam outlet port and a third conduit for steam flow communication of said compressed steam outlet port with said inlet port of said second flow passage of said heat exchanger, and D) means for maintaining said first flow passage, said first conduit, said separating chamber, said steam outlet port of said cyclone and said second conduit at a pressure below the pressure within said second flow passage, said at least one compressor and said third conduit.

Broadly the invention contemplates a method of removing diluent water from an aqueous fluid mixture comprising: a) heating, with hot steam, an aqueous fluid mixture containing diluent water to produce a hot frothing mass of the mixture containing bubbles of stem vapor, at a first pressure, b) feeding said hot frothing mass into a separating chamber of a cyclone, c) separating the hot frothing mass cyclonically in said separating chamber at said first pressure with formation of a discrete hot liquid phase and a discrete steam vapor phase, in said separating chamber, d) recovering said hot liquid phase from said separating chamber, d) recovering said steam vapor phase from said separating chamber, f) compressing said steam vapor phase in at least one compression stage to develop a hot compressed steam at a second pressure, and g) recycling said hot compressed steam at said second pressure from step f) to step a) for said heating of the aqueous fluid mixture in step a), said first pressure being below said second pressure.

DESCRIPTION OF PREFERRED EMBODIMENTS

The invention is described herein by reference to the preferred embodiment which involves recovery of a reusable aircraft deicer fluid (ADF) from a dilute spent deicer fluid.

The invention exploits a thermodynamic cycle, namely, steam vapor recompression, in conjunction with cyclonic separation with exhaustion of steam vapor in a cyclone concentrator from a hot, frothing liquid mass derived from spent ADF.

ADF typically contains 50 to 60%, by weight, of a deicing glycol, for example, ethylene glycol, propylene glycol or mixtures of such glycols, and 40 to 50%, by weight, of water as well as minor amounts of additives such as surfactants and corrosion inhibitors. Spent ADF recovered from the tarmac and diluted with aqueous precipitate which it contacts on the surface of the aircraft, during deicing operations, and subsequently on the tarmac contains 5 to 20%, by weight, more usually 10 to 12%, by weight, of glycol; and 80 to 95%, by weight, more usually 88 to 90%, by weight, of water.

The method and apparatus of the invention provide an energy efficient route for recovery from the spent ADF of an aqueous solution of the glycol having a concentration of the glycol comparable with that of ADF, i.e., 50 to 60%, by weight, glycol and 40 to 50%, by weight, water, and clean water with a very low content of glycol. The ability to recover a clean water with low content of glycol is especially important when the water is to be sewered through municipal sewer systems where standards of cleanliness may apply because of environmental concerns.

The method and apparatus are operated with most of the system including the first flow passage of the heat exchanger, the cyclonic concentrator and the steam exhaust line under a first pressure which typically is below atmospheric pressure, for example, 11 to 15 psia, but with the second flow passage of the heat exchanger, the at least one compressor and the steam line from the compressor to the second flow passage under a second pressure which is above the first pressure, and typically above atmospheric pressure. Typically the first pressure is at least 5 psi below the second pressure; the second pressure being for example, 16 to 20 psia. In particular the first pressure is such as to create a vacuum or partial vacuum effect in the first flow passage, the cyclonic concentrator and steam exhaust line from the cyclonic separator relative to the steam system comprising the second flow passage, the at least one compressor and the steam line from the at least one compressor to the second flow passage.

When a solution based on water and a water miscible organic liquid in which the organic liquid has the higher boiling temperature is heated to boiling, a hot frothing mass is produced which comprises a hot liquid phase comprising the hot water-miscible organic liquid and a vapor phase predominantly of steam with a small amount of vapor of the water-miscible organic liquid, the vapor phase may be partially separated from the hot liquid phase of the frothing mass but may also be present as vapor bubbles in such hot liquid phase. The vapor bubbles do not readily separate from the hot liquid phase.

In the method of the invention the hot frothing mass of aqueous glycol and steam is formed in a plate heat exchanger at a first pressure and is delivered at such first pressure to a cyclonic separator maintained at the first pressure. Cyclonic separation of the steam bubbles within the frothing liquid mass proceeds efficiently in the reduced pressure environment of the cyclone separator. The reduced pressure also serves to exhaust the vapor phase of the hot mass from the cyclone concentrator into the steam line to the compressor stage, which is at a higher pressure, which steam line is also under the reduced pressure relative to the steam system.

Thus a hot frothing mass of the liquid and vapor phases is formed in the plate heat exchanger at a first pressure below atmospheric pressure and the hot frothing mass of the liquid and vapor phases is delivered from the plate heat exchanger to the cyclonic separator which is maintained at such first pressure.

The steam vapor together with a small amount of glycol vapor is cyclonically separated from the hot frothing mass as a vapor phase, and is exhausted from the cyclone concentrator to the compression stage, leaving behind a hot liquid phase of reduced water content. In this way the dilute spent ADF is concentrated. The hot liquid phase can be recycled back to the plate heat exchanger until a desired concentration of the glycol is achieved.

The higher pressure of the steam in the second flow passage of the plate heat exchanger provides a steam having a temperature effective to heat the spent ADF in the first flow passage to the boiling temperature of the spent ADF to produce the hot frothing mass of the aqueous glycol and steam, above a hot liquid phase of spent ADF. The hot frothing mass has the same proportions of glycol and water, in vapor or liquid form, as in the hot liquid phase.

In the continuous operation of the method a level of the hot liquid phase is maintained in the plate heat exchanger for continuous development of the hot frothing mass, the separation of the hot frothing mass into the discrete vapor and liquid phases is carried out in the cyclone.

The steam vapor exhausted from the cyclone concentrator is compressed in the compression stage with compressors or blowers. The compressed steam produced is desuperheated with hot distillate or condensate formed by the condensation of steam in the plate heat exchanger and the desuperheated compressed steam at the second pressure is cycled from the compression stage as steam input providing the condensing phase in the plate heat exchanger, heat being transferred from the compressed steam to the dilute spent ADF.

Provision is made to recycle condensate formed in the compression of the steam in the compressor stage, and a portion of the steam exhausted from the cyclone concentrator and which may contain a small amount of glycol vapor back to the cyclone concentrator to enhance the separation of a water component free of or containing only a small amount of glycol from the aqueous glycol reusable as ADF, and also to enhance the glycol recovery.

The hot concentrate of glycol and water recovered from the cyclone separator is employed to preheat diluted spent ADF prior to delivery of the diluted spent ADF to the plate exchanger. The hot steam distillate or condensate from the plate heat exchanger is also employed to preheat the diluted spent ADF. A preheating heat exchanger employs separate flows of the recovered hot concentrate of glycol and water, and the hot steam condensate in heat exchange countercurrent flow with the diluted spent ADF.

The diluted spent ADF prior to being preheated is filtered with filters of conventional type to remove contaminants, for example, mechanical filter bed systems may be employed to remove grit and other solid particles from the liquid phase and activated charcoal beds may be employed to remove water-immiscible liquids, for example, hydrocarbon oils.

BRIEF DESCRIPTION OF THE DRAWINGS

FIG. 1 is a schematic representation of a aircraft deicing fluid recovery apparatus of the invention.

DESCRIPTION OF PREFERRED EMBODIMENTS WITH REFERENCE TO THE DRAWINGS

With further reference to FIG. 1, an aircraft deicing fluid recovery apparatus 10 includes a plate heat exchanger 12, a cyclone concentrator 14, a compressor assembly 16, a preheating heat exchanger 18, a distillate tank 20, a recovery tank 22 providing a source of spent aircraft deicer fluid, a concentrate tank 24, filters 26 and an electrical heater 28.

Plate heat exchanger 12 includes a flow passage 30 for spent aircraft deicing fluid containing diluent water and a flow passage 32 for steam, the flow passage 30 being in heat exchange relationship with the flow passage 32.

Flow passage 30 includes inlet port 34 for the spent fluid and outlet port 36 for a hot frothing mass of liquid deicing fluid mixed with bubbles of steam vapor. Flow passage 32 includes an inlet port 38 for steam and an outlet port 40 for condensed steam.

Cyclone concentrator 14 includes an inlet port 42 for the hot liquid/steam mass, an outlet port 44 for steam, an outlet port 46 for hot deicing fluid, a recycling outlet port 48 for hot deicing fluid and an inlet port 50 for distillate which may contain deicing fluid glycol.

A conduit 52 provides liquid flow connection between outlet port 36 of plate heat exchanger 12 and inlet port 42 of cyclone concentrator 14.

A conduit 54 provides steam flow communication between the steam outlet port 44 of cyclone concentrator 14 and the compressor assembly 16.

A recycle conduit 56 provides liquid flow communication between recycling outlet port 48 of cyclone concentrator 14 and inlet port 34 of plate heat exchanger 12.

Outflow conduit 58 provides liquid flow communication between outlet port 46 of cyclone concentrator 14 and pre-heating heat exchanger 18.

Conduit 60 provides liquid flow communication between compressor assembly 16 and the distillate inlet port 50.

Compressor assembly 16 includes compressors 62, 68 and 74.

Compressor 62 has an inlet port 64 for steam and an outlet port 66 for compressed steam. Compressor 68 has an inlet port 70 for compressed steam from compressor 62 and an outlet port 72 for compressed steam which has been subjected to further compression. Compressor 74 has an inlet port 76 for the compressed steam from compressor 68 and an outlet port 78 for the final compressed steam.

Steam line 80 provides steam flow communication between outlet port 66 of compressor 62 and inlet port 70 of compressor 68. Steam line 82 provides steam flow communication between outlet port 72 of compressor 68 and inlet port 76 of compressor 74. Steam line 84 provides steam flow communication between outlet port 78 of compressor 74 and steam inlet port 38 of plate heat exchanger 12.

Each of compressors 62, 68 and 74 has a desuperheating inlet port 86, each of which inlet ports 86 is in liquid flow communication with a branch line 88 from a hot distillate line 90.

Each of compressors 62, 68 and 74 has a drain line 92 and a drain line 93 is provided from distillate conduit 60.

Preheating heat exchanger 18 has a central conduit 94, an outer annular conduit 96 and an intermediate annular conduit 98. Intermediate annular conduit 98 circumscribes central conduit 94 and outer annular conduit 96 circumscribes intermediate annular conduit 98.

Intermediate annular conduit 98 is in heat exchange relationship with central conduit 94 and outer annular conduit 96.

Central conduit 94 has an inlet port 100 and an outlet port 102. Outer annular conduit 96 has an inlet port 104 and an outlet port 106 and intermediate annular conduit 98 has an inlet port 108 and an outlet port 110.

Conduit 114 provides flow communication between outlet port 102 of central conduit 94 and concentrate tank 24.

Conduit 116 provides flow communication between distillate tank 20 and inlet port 104 of outer annular conduit 96.

Conduit 118 provides flow communication between outlet port 106 of outer annular conduit 96 and electrical heater 28.

A branch line 112 from conduit 118 connects to a sewer 120.

Conduit 122 provides a liquid flow communication between the recovery tank 22 and inlet port 108 of intermediate annular conduit 98.

Conduit 124 provides liquid flow communication between outlet port 110 of intermediate annular conduit 98 and inlet port 34 of plate heat exchanger 12.

Conduit 126 provides liquid flow communication between outlet port 40 of plate heat exchanger 12 and electrical heater 28 and conduit 128 provides liquid flow communication between electrical heater 28 and distillate tank 20.

Distillate tank 20 has an inlet port 130 and an outlet port 132. A line 134 provides liquid flow communication between outlet port 132 with conduit 116 and hot distillate line 90.

A valve 136 in line 90 controls flow from line 134 between line 90 and conduit 116. Filter 138 is disposed in line 90 as is a drain line 140.

A hot distillate line 90 feeds hot distillate to steam line 54 to desuperheat the steam entering compressor 62. The distillate introduced into steam line 54 from distillate line 90 also serves to extract from the steam vapor, glycol vapor which has been entrained by the steam vapor.

A steam recycle conduit 142 provides flow communication between steam line 54 and distillate conduit 60 to distillate inlet port 50.

A secondary cyclone 144 is disposed in steam line 84. Secondary cyclone 144 has a distillate line 146 providing flow communication between the secondary cyclone 144 and distillate conduit 60.

Valves are disposed throughout apparatus 10 for control of flow, including prevention of flow in various lines and conduits, including valve 148 in line 134, valve 150 in steam recycle conduit 142, valve 152 in outflow conduit 58, valve 154 in conduit 122, valve 156 in conduit 114, valve 158 in branch 112 to sewer 120 and valve 160 in branch line 162 from outflow conduit 58 to conduit 124.

Distillate tank 20 includes a vent line 164.

The apparatus 10 includes several pumps for flow of liquids through apparatus 10 under pressure including pump 166 in conduit 122, pump 168 in outflow conduit 58, pulp 170 in line 134 and pulp 172 in hot distillate line 90.

An absolute pressure transmitter or monitor 174 and a temperature transmitter or monitor 176, monitor the pressure and temperature, respectively in the cyclone concentrator 14. Based on tabulated data the concentration of glycol in the discrete hot liquid phase in cyclone concentrator 14 is determined. The tabulated data provides the concentration of glycol in the discrete hot liquid for given values of pressure and temperature in the cyclone 14 for a given glycol concentration in the feed to flow passage 30 of plate heat exchanger 12.

This tabulated data may be stored in memory in a computer (not shown), the values of pressure and temperature are fed constantly to the computer together with the glycol concentration of the feed to flow passage 30 of plate heat exchanger 12 whereby the concentration of glycol in the discrete liquid phase in cyclone concentrator 14 is computed on an ongoing basis.

Operation of the apparatus 10 to concentrate spent aircraft deicing fluid by removal of diluent water proceeds as follows: the spent diluted deicing fluid is pumped from recovery tank 22 to plate heat exchanger 12 by pump 166. The spent fluid flows through conduit 122 and filters 26 (two of which are shown) to preheating heat exchanger 18 where it enters at inlet port 108 flowing along intermediate annular conduit 98 to outlet port 110. In preheating heat exchanger 18, the dilute spent fluid flowing along intermediate annular conduit 98 is in countercurrent flow and heat exchange relationship with hot concentrated deicer fluid flowing along central conduit 94 and hot steam condensate flowing along outer annular conduit 96 of preheating heat exchanger 18.

In this way the dilute spent deicer fluid is preheated.

The preheated dilute spent deicer fluid flows from outlet port 110 of preheating heat exchanger 18 along conduit 124 to inlet port 34 and thence along flow passage 30 of plate heat exchanger 12 at a first pressure, preferably under partial vacuum. At the same time, steam is fed through inlet port 38 into flow passage 32 of plate heat exchanger 12 at a second pressure higher than the first pressure. The steam in flow passage 32 condenses and as it condenses heats the dilute spent deicer fluid in flow passage 30 producing a hot, boiling, foaming mass of the spent deicer fluid and steam which exits plate heat exchanger 12 at outlet port 36 and flows along conduit 52 entering cyclone concentrator 14 at inlet port 42.

A level of hot liquid is maintained in the flow passage 30, this hot liquid contains the same proportions of glycol and water as in the hot frothing mass. As the hot liquid is converted to hot frothing mass and delivered to the cyclone concentrator 14, it is replenished by the feed of spent deicer fluid from the preheating heat exchanger 18.

The steam introduced through steam inlet port 38 to flow passage 32 is compressed or recompressed steam at elevated pressure, for example, 5 psi above the first pressure (in flow passage 30), which steam condenses at its equilibrium temperature of 109° C. The boiling point of the glycol deicer fluid would be higher than the steam temperature if the pressures were equal, but the differential in pressure causes the steam to be hotter making the heat flow from the steam in flow passage 32 to the spent deicer liquid in flow passage 30, as the steam condenses in flow passage 32.

In the cyclone concentrator 14, steam vapor is separated from hot liquid deicer fluid. The liquid deicer fluid being drawn to the lower region of the cyclone concentrator 14 and the steam being exhausted from the upper region through outlet port 44.

The steam vapor flows from outlet port 44 along conduit 54 to compressor assembly 16. Conduit 54, outlet port 44 and the interior of cyclone concentrator 14 are maintained at the first pressure which typically is a partial vacuum at a pressure below atmospheric pressure.

The steam is thus exhausted from cyclone concentrator 14 along conduit 54 and passes sequentially through compressors 62, 68 and 74 where it is subjected to successive compression. Compressed steam exits compressor assembly 16 at outlet port 78 and flows along steam line 84 to inlet port 38 of plate heat exchanger 12. Secondary cyclone 144 in steam line 84 serves to separate condensed steam and entrained glycol deicer fluid which is withdrawn through distillate line 146 to distillate conduit 60 and is recycled to cyclone 14 for recovery of the glycol content.

In compressor assembly 16, hot distillate or condensate removed from plate heat exchanger 12 at outlet port 40 is fed from hot distillate line 90 along branch lines 88 to a desuperheating inlet port 86 associated with each of lines 80, 82 and 84. This water enters the flow of compressed steam and desuperheats the compressed steam to maintain the temperature within the required limits of operation of the compressors 62, 68 and 74 and converts the heat of compression and friction heat developed by the compressors into latent heat held by the steam. Any excess desuperheating water retained in the compressed steam is removed by the secondary cyclone 144 as described hereinbefore. Water accumulated in the compressors 62, 68 and 74 is removed at the drains 92 and a portion of the final water discharged from compressor 74 is fed along distillate conduit 60 to distillate inlet port 50 of cyclone concentrator 14 whereby residual glycol deicer fluid entrained in the steam removed through conduit 54 from cyclone concentrator 14 may be recovered.

A portion of the steam passing along conduit 54 from cyclone concentrator 14 to compressor assembly 16 is recycled to cyclone concentrator 14 along steam recycle conduit 142, also as a means of returning to the cyclone concentrator 14 the small amounts of glycol deicing fluid entrained in the steam withdrawn from cyclone concentrator 14.

The concentrated deicer fluid exits cyclone concentrator 14 at outlet port 46 and is pumped by pump 168 along outflow conduit 58 to inlet port 100 of the central conduit 94 of preheating heat exchanger 18 where it flows in counter current flow with the dilute spent deicer fluid to be treated, the heat of the concentrated deicer fluid being employed to preheat the dilute spent deicer fluid. The concentrated deicer fluid flows from preheating heat exchanger 18 through outlet port 102 and along conduit 114 to concentrate tank 24. The concentration of the concentrated deicer fluid in cyclone concentrator 14 is monitored.

The flow of concentrated deicer fluid in outflow conduit 58 is controlled by valve 152 in response to the concentration of glycol determined from the pressure and temperature (determined by monitors 174 and 176, respectively) in cyclone concentrator 14, and the known concentration of glycol in the spent diluted deicing fluid feed. If the concentration falls below a predetermined or required level, the flow in outflow conduit 58 is reduced or interrupted and the concentrated deicer fluid of an unacceptable concentration is returned to inlet port 34 of plate heat exchanger 12 via recycling outlet port 48 of cyclone concentrator 14 and recycling conduit 56 whereby the concentration of the glycol in the deicer fluid may be raised to an acceptable level.

Likewise the level of glycol in the steam condensate in line 60 and in steam recycle conduit 142 may be monitored. If the content of glycol in the steam condensate being withdrawn from compressor 74 and in conduit 142 is significant, the recycling along distillate conduit 60 to enter the cyclone concentrator 14 at inlet port 50 is continued whereby the glycol may be recovered in cyclone concentrator 14. If the concentration of glycol in the steam condensate in distillate line 60 is insignificant, the flow into cyclone concentrator 14 along distillate line 60 may be discontinued or reduced and the condensate drained at drain 92 or 93; and the flow along conduit 142 may be discontinued or reduced by valve 150.

The condensed steam formed in flow passage 32 as a result of the heat exchange, is typically at a temperature of 109° C. and flows from outlet port 40 and along conduits 126 and 128 to enter distillate tank 20 at inlet port 130. The electric heater 28 between conduits 126 and 128 may be employed to further heat the steam condensate where necessary. The steam condensate in distillate tank 20 exits at outlet port 132 and is pumped by pump 170 along line 134 to feed conduit 116 and hot distillate line 90 as required. Line 134 includes a valve 148 to regulate the flow.

A level of distillation is maintained in distillate tank 20. Level switches designated LS provide information as to the level of distillate in tank 20 and the valve 148 and pump 170 are controlled or operated accordingly.

The distillate or steam condensate in conduit 116 flows to inlet port 104 of outer annular conduit 96 of preheating heat exchanger 18 and flows along annular conduit 96 in countercurrent flow with the dilute spent deicing fluid flowing in intermediate annular conduit 98, where the heat of the steam condensate is employed to preheat the dilute spent deicer fluid.

The steam condensate exits preheating heat exchanger 18 at outlet port 106 and flows along conduit 118 to rejoin the condensate in conduit 126. A portion of the condensate may flow along branch line 112 from conduit 118 to sewer 120.

At the start up electrical heater 28 is employed to develop a required temperature for the steam condensate employed in the preheating exchanger 18 and the hot distillate in hot distillate line 90, heat of which is also employed to heat steam withdrawn from cyclone concentrator 14 along steam line 54 and to supplement the steam content fed to compressor assembly 16.

After the required temperatures have been established, the electrical heater 28 may be turned off. Thereafter the system operates without the need for heat input by developing fresh compressed steam for plate heat exchanger 12 in the compressor assembly 16 from the steam vapor withdrawn from the cyclone concentrator 14. The preheating heat exchanger 18 also maximizes the efficient use of heat developed within the system.

At the start-up the system passes through a fill-in heat-up cycle for a period prior to the intended operation. In this stage the compressor assembly 16 is dormant. When the temperature in the cyclone concentrator 14 is close to the required operation temperature, the compressor assembly 16 is brought into operation and the cycle commences.

It is important to drain accumulated condensate from the compressor assembly 16 at the drains 92 periodically and especially prior to operation of the compressor assembly 16.

The operation of the compressors 62, 68 and 74 is controlled so that each operates at a speed to maintain a desired differential set point. During normal operation with all three compressors 62, 68 and 74 set to run at the some percent speed, it is normal for a particular blower to run at a higher temperature and with a higher current draw than a preceding compressor. In order to achieve a more balanced load on the three compressors 62, 68 and 74, it is found appropriate to operate the compressors so that they run at slightly different speeds while still maintaining the set point. Thus, by way of example, compressor 62 may be set to run at 100% speed, compressor 68 at 95% speed and compressor 74 at 90% speed. This tends to balance the load between the compressors. Observation and experience dictates the most appropriate settings to use under different operating circumstances.

The function of different valves and pumps and drains in the system will be apparent from the foregoing description even if not precisely indicated.

The vent line 164 has a condenser which minimizes the venting of steam and odors.

The apparatus 10 and the process of the invention permit efficient recovery of deicer fluid from a spent deicer fluid diluted with water as recovered from the tarmac where aircraft deicing is carried out. The apparatus and process thus provide environmental advantages in that the organic liquid component of the deicing fluid is recovered rather than discharged as waste, while at the same time the recovery is energy efficient. Furthermore, the water recovered from the dilute spent deicing fluid after being employed as compressed steam in plate heat exchanger 12, is removed from the system and has a low content of glycol and may be fed into municipal sewers without causing environmental problems.

In particular the apparatus 10 of the invention is capable of processing 1,000 liters per hour of dilute spent aircraft deicing fluid having a glycol concentration of about 10%, by weight, to produce an aqueous solution of the glycol at a concentration of glycol of about 50%, by weight, and clean water containing less than 1%, by weight, of glycol.

The apparatus 10 is designed for withdrawal of ADF concentrate automatically along outflow conduit 58 when the desired concentration is reached. Monitoring of pressure and temperature in the cyclone concentrator 14 provides an evaluation of the concentration of the ADF at the bottom of cyclone concentrator 14 on an ongoing basis.

Suitably the system is operated so that valve 148 in line 134 provides a flow rate of 1 liter/min. to 1 to 1.5 liters/min. above the target flow rate. Operating in this way the system will occasionally go into a recirculation mode to maintain an adequate level of distillate or condensed steam in distillate tank 20. If the level of distillate in distillate tank 20 is high, flow of distillate from tank 20 is increased in line 134 by adjustment of valve 148.

The concentrate flow adjusting valve 152 is set as soon as the desired concentration of ADF is achieved. The concentration is tested regularly as by monitor 174 to confirm that the desired concentration is maintained.

Thus if the concentration is too low the flow of concentrate in line 58 is reduced with valve 152 and the ADF of insufficient glycol concentration returned to line recycle conduit 56 via branch line 162, with flow also being directed from concentrator 14 through recycle port 48 to recycle conduit 56 and thence to plate heat exchanger 12.

If the concentration of the ADF in line 58 is too high the flow rate is increased until the desired concentration is achieved.

In FIG. 1 temperature transmitters are identified as TT, temperature indicators by TI, pressure transmitters by PT and pressure indicators by PI; H identifies heaters; APT identifies an absolute pressure transmitter, PS identifies a pressure switch, LS identifies the level switch.

As indicated hereinbefore, while the invention has been described by reference to an especially important embodiment in which diluent water is removed from spent deicing fluid, the method and apparatus may also be applied to other aqueous fluid mixture, where water is to be removed; by way of example there may be mentioned desalination of salt water, removal of water from a contaminated ground water and removal of water from aqueous industrial effluent.

In the important embodiment in which water is removed from spent deicing fluid the resulting fluid may be re-used as deicing fluid or for other purposes, for example, anti-freeze.

We claim:

1. A method of removing diluent water from spent deicing fluid to provide a re-usable fluid comprising:
   a) heating, with hot steam, a spent deicing fluid containing diluent water to produce a hot frothing mass of liquid deicing fluid containing bubbles of steam vapor, at a first pressure,
   b) feeding said hot frothing mass into a separating chamber of a cyclone,
   c) separating the hot frothing mass cyclonically in said separating chamber at said first pressure with formation of a discrete hot liquid deicing fluid phase and a discrete steam vapor phase, in said separating chamber,
   d) recovering said hot liquid deicing fluid phase from said separating chamber,
   e) recovering said steam vapor phase from said separating chamber,
   f) compressing said steam vapor phase in at least one compression stage to develop a hot compressed steam at a second pressure, and
   g) recycling said hot compressed steam at said second pressure from step f) to step a) for said heating of the spent deicing fluid in step a),
   said first pressure being below said second pressure.

2. A method according to claim 1, wherein said spent deicing fluid containing diluent water in step a) comprises 5 to 20%, by weight, of a deicing glycol and 80 to 95%, by weight, of water, and said hot liquid deicing fluid phase recovered in step d) comprises 50 to 60%, by weight, of said deicing glycol and 40 to 50%, by weight, of water.

3. A method according to claim 2, wherein said deicing glycol is selected from ethylene glycol or propylene glycol.

4. A method according to claim 3, wherein said first pressure is at least 5 psi below said second pressure.

5. A method according to claim 4, wherein said first pressure is 11 to 15 psia and said second pressure is 16 to 20 psia.

6. A method according to claim 1, wherein hot distillate water is fed to said at least one compression stage in step f) to desuperheat said hot compressed steam.

7. A method according to claim 2, further including recovering a hot steam condensate derived from said hot steam in step a), and preheating said spent deicing fluid containing diluent water prior to step a) with said hot steam condensate.

8. A method according to claim 7, wherein said preheating further includes a preheating of said spent deicing fluid containing diluent water prior to step a) with hot liquid deicing fluid of said phase recovered in step d).

9. A method according to claim 8, wherein said heating in step a) is carried out in a plate heat exchanger and said preheating prior to step a) is carried out in a heat exchanger providing countercurrent flow of the spent deicing fluid containing diluent water relative to flows of said hot steam condensate and said hot liquid deicing fluid.

10. A method according to claim 9, wherein said spent deicing fluid containing diluent water is filtered prior to said preheating.

11. A method according to claim 2, including a step of:
   h) monitoring the concentration of deicing glycol in said hot liquid deicing fluid phase recovered in step d) and recycling the recovered phase to step a) until a desired concentration of deicing glycol is achieved in the hot liquid deicing fluid phase recovered in step d).

12. A method according to claim 9, including a step of:
   h) monitoring the concentration of deicing glycol in said hot liquid deicing fluid phase recovered in step d) and recycling the recovered phase to step a) until a desired concentration of deicing glycol is achieved in the hot liquid deicing fluid phase recovered in step d).

13. A method according to claim 12, wherein in step a) said hot frothing mass is produced above a hot liquid phase of said spent deicing fluid containing diluent water, said hot frothing mass and said hot liquid phase containing the same relative proportions of glycol and water, in liquid or vapor form; and wherein
   said hot liquid phase is continuously replenished by a feed of the spent deicing fluid containing diluent water from said preheating, as said hot frothing mass is fed to said separating chamber of said cyclone.

14. Apparatus for removing diluent water from an aqueous fluid mixture comprising:
   A) a heat exchanger having a first flow passage therethrough for an aqueous fluid mixture containing diluent water, said first passage being in heat exchange relationship with a second flow passage for steam, said first passage having an inlet port and an outlet port, and said second flow passage having an inlet port and an outlet port;
   B) a cyclone having a separating chamber with liquid inlet port and a first conduit for liquid flow communication of said outlet port of said first passage with said inlet port of said cyclone; a steam outlet port in said cyclone and a liquid outlet port communicating with said separating chamber in said cyclone;
   C) at least one compressor for compressing steam having a steam inlet port and a second conduit for steam flow communication of said steam outlet port of said cyclone with said steam inlet port of said at least one compressor; a compressed steam outlet port and a third conduit for steam flow communication of said compressed steam outlet port with said inlet port of said second flow passage of said heat exchanger, and
   D) means for maintaining said first flow passage, said first conduit, said separating chamber, said steam outlet port of said cyclone and said second conduit at a pressure below the pressure within said second flow passage of said heat exchanger, said at least one compressor and said third conduit.

15. Apparatus according to claim 14, further including a recycling liquid outlet port in said cyclone, and a fourth conduit for liquid flow communication of said recycling liquid outlet port of said cyclone with said inlet port of said first passage of said heat exchanger.

16. Apparatus according to claim 15, further including a distillate tank for providing a source of hot distillate water, a first conduit means for liquid flow communication of said outlet port of said second flow passage of said heat exchanger with an inlet port of said distillate tank; and heating means in said first conduit means for heating distillate water; said distillate tank having an outlet port for hot distillate water.

17. Apparatus according to claim 16, further including a preheating heat exchanger having an intermediate annular passage for flow of the aqueous fluid mixture containing diluent water, an outer annular passage circumscribing said intermediate annular passage, and an inner passage circumscribed by said intermediate annular passage; said outer and inner passages being in heat exchange relationship with said intermediate passage; and a fifth conduit for liquid flow communication of said intermediate passage with said inlet port of said first passage of said heat exchanger.

18. Apparatus according to claim 17, further including a sixth conduit for liquid flow communication of said outlet port of said distillate tank with said outer passage of said preheating heat exchanger, and a seventh conduit for liquid flow communication of said liquid outlet port of said cyclone with said inner passage of said preheating heat exchanger.

19. Apparatus according to claim 18, further including a desuperheating inlet port in said at least one compressor and an inlet line for flow of hot distillate water to said desuperheating inlet port for desuperheating compressed steam developed in said at least one compressor, said inlet line being in liquid flow communication with said sixth conduit.

20. Apparatus according to claim 19, further including a condensed water outlet port in said at least one compressor and an eighth conduit for liquid flow communication of said water outlet port with said cyclone for recycling to said cyclone, water and organic liquid entrained by steam from said cyclone.

* * * * *